Nov. 17, 1953  N. C. PRICE  2,659,529
COOLING MEANS FOR THE ROTORS OF GAS TURBINE POWER PLANTS
Original Filed June 2, 1945  4 Sheets-Sheet 1
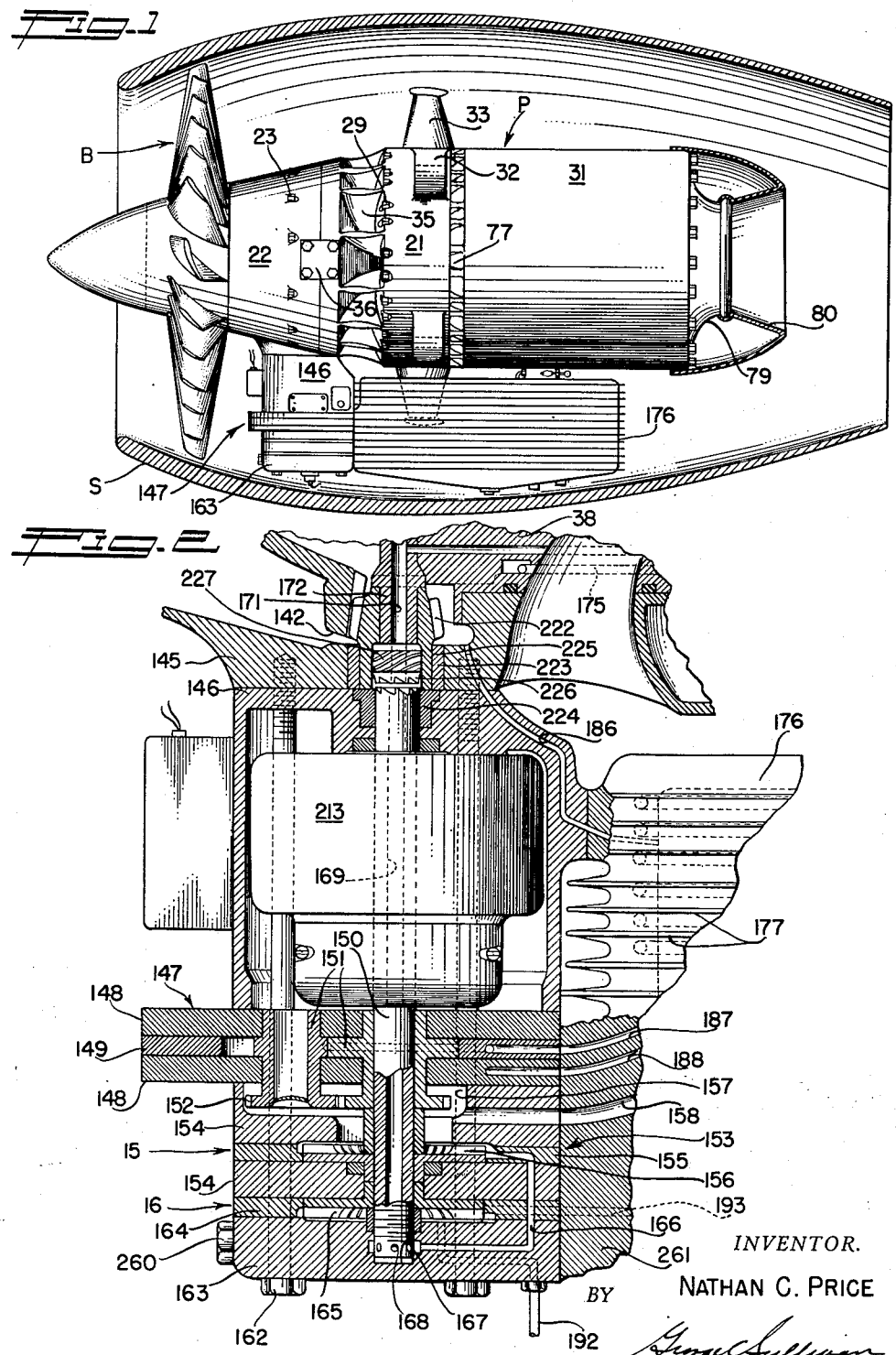
INVENTOR.
NATHAN C. PRICE
BY
George C. Sullivan
Agent

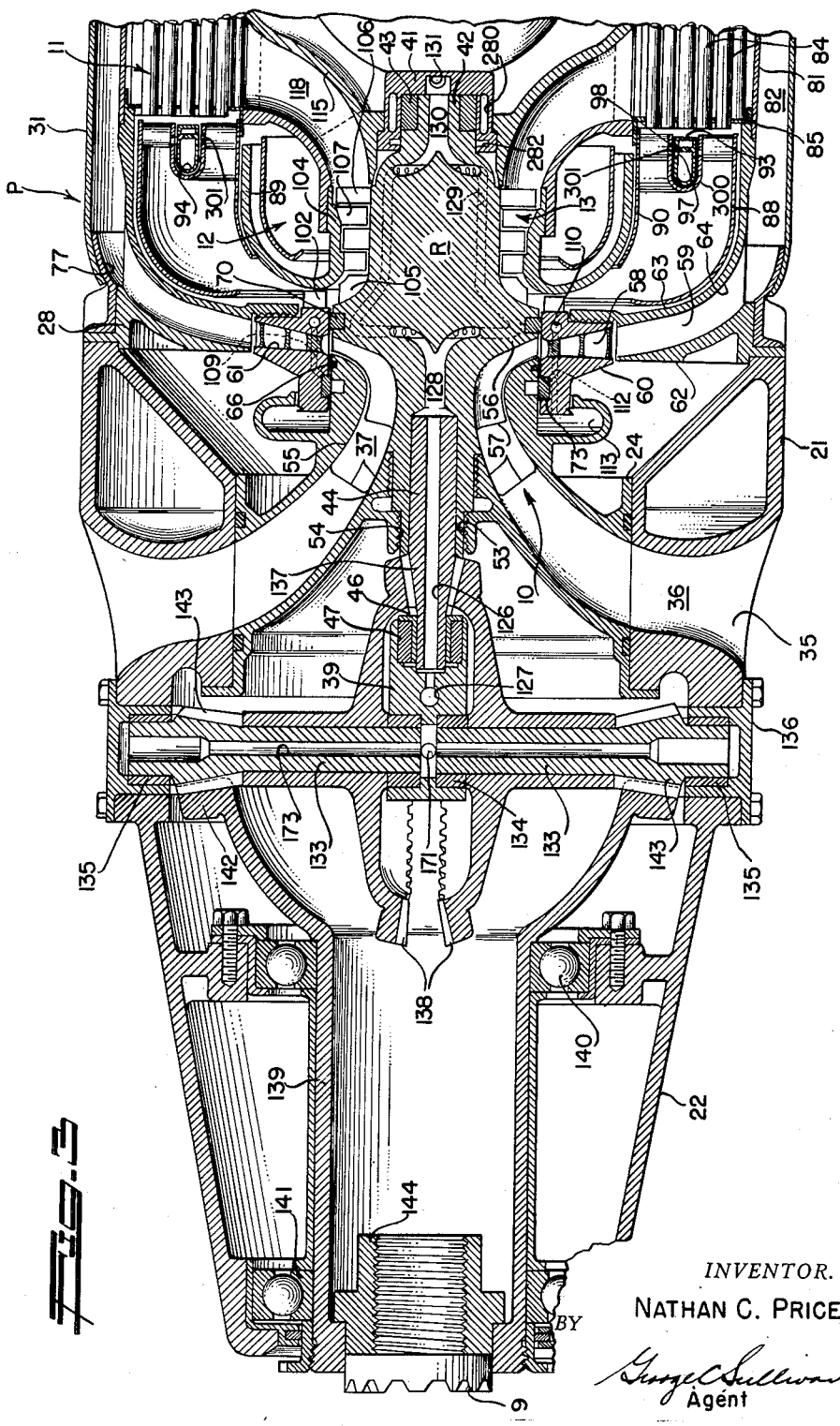

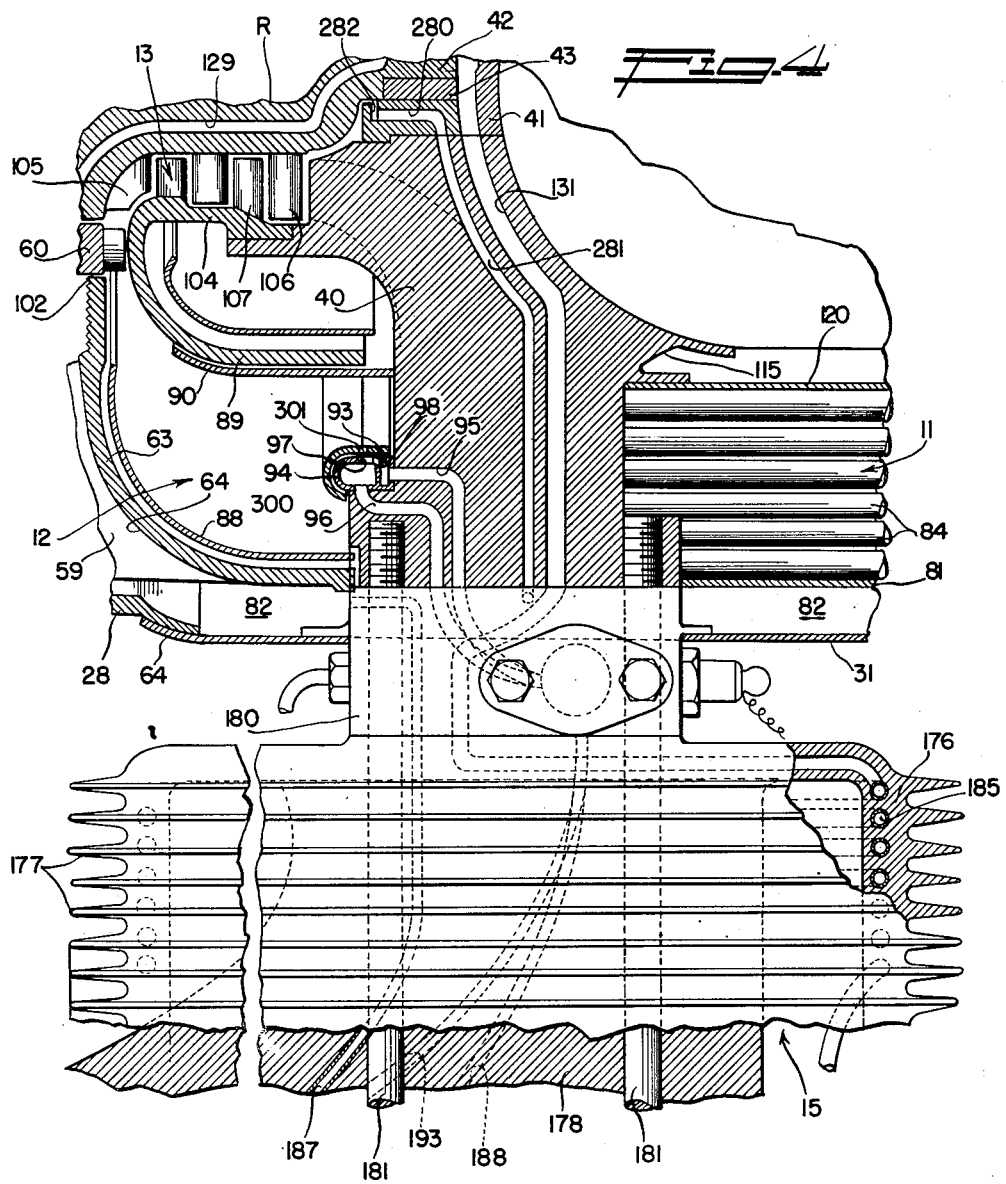

Nov. 17, 1953    N. C. PRICE    2,659,529
COOLING MEANS FOR THE ROTORS OF GAS TURBINE POWER PLANTS
Original Filed June 2, 1945    4 Sheets-Sheet 4

*INVENTOR.*
NATHAN C. PRICE
BY
Agent

Patented Nov. 17, 1953

2,659,529

UNITED STATES PATENT OFFICE 2,659,529

COOLING MEANS FOR THE ROTORS OF GAS TURBINE POWER PLANTS

Nathan C. Price, Hollywood, Calif., assignor to Lockheed Aircraft Corporation, Burbank, Calif.

Original application June 2, 1945, Serial No. 597,308, now Patent No. 2,613,501, dated October 14, 1952. Divided and this application March 3, 1948, Serial No. 12,821

2 Claims. (Cl. 230—116)

This invention relates to internal combustion turbo power plants and relates more particularly to lubricating and cooling systems for such power plants. This application is a division of my copending application, Serial No. 597,308 filed June 2, 1945, now Patent No. 2,613,501.

In internal combustion turbo power plants, the turbine rotor and air compressor elements rotate at high speeds and it is essential that a dependable, efficient lubricating system be provided for the bearings of these elements. Furthermore, it is usually found necessary to cool the turbine rotor which is subjected to the high temperature driving or propulsion gases. It has been the general practice in the past to provide separate and distinct lubricating systems and rotor cooling means which necessarily increase the complexity of the machine and materially add to its cost of manufacture.

It is one important object of the present invention to provide a gas turbo power plant embodying a simple, dependable and efficient system for lubricating the bearings of the compressor and turbine rotor and for cooling both the compressor and turbine portions of the rotor. In accordance with the present invention the lubricating medium for lubricating the bearings is circulated in a manner to also serve as a coolant for absorbing heat from the rotor, thus materially simplifying the engine construction.

It is another object of the invention to provide an internal combustion gas turbine power plant in which the compressor-turbine rotor is internally cooled by the flow of lubricating oil and externally cooled by air flow. A multiplicity of passages in the peripheral portion of the rotor circulate the lubricating oil at a substantial velocity to carry away the heat from the turbine portion of the rotor while the bearing part at the rear of the rotor is cooled by oil flow and by the flow of cooling air through an internal annular chamber in the bearing. Heat is conducted away from the compressor portion of the rotor wheel by the air handled by the compressor as well as by the internal lubricating oil flow. The transference of heat to the rapidly moving oil in the multiplicity of peripheral passages and to the flowing air prevents overheating of the rotor and turbine blading and the disposition of the oil passages is such that the highly stressed central portion of the rotor may be left solid. The oil passages being located in the peripheral area of the rotor reduce the centrifugal effects imposed on the high speed rotor.

Another object of the invention is to provide a lubricating system of the character referred to which incorporates a sump for receiving the heated oil and through which fuel and injection air under pressure pass so that the fuel and injection air move in heat transfer relation to the heated oil to absorb heat therefrom prior to introduction into the combustion chamber, thereby promoting better combustion and increasing the thermal efficiency of the power plant.

Another object of the invention is to provide a lubricating system of the character referred to which serves to lubricate the bearings of the transmission gear set, transmitting power from the turbine rotor to the driven part, and also serves to lubricate the bearings of a counter-rotating bladed ring associated with or surrounding the compressor and turbine rotor. The lubricating oil is directed under pressure to the bearings of the speed reduction gearing and counter-rotating ring and a single lubricant pump acts to supply the lubricant under pressure to the several bearings of the power plant.

It is a further object of the invention to provide a lubricating system of the class referred to wherein the lubricant pump is driven by a motor-generator during starting of the power plant so as to prelubricate the several bearings of the machine during the starting operations. The lubricant pump is driven by the motor-generator when the latter operates as a motor to start the power plant and is driven by the turbine rotor when the motor-generator serves as a generator.

Other objectives and features of the invention will become apparent from the following detailed description of a typical embodiment wherein reference is made to the accompanying drawings in which Figure 1 is a side elevation of a power plant embodying the features of the present invention;

Figure 2 is an enlarged fragmentary vertical section of the auxiliary unit and adjacent parts of the power plant;

Figure 3 is an enlarged horizontal cross-sectional view of the forward major portion of the power plant;

Figure 4 is a fragmentary vertical sectional view of a portion of the power plant with certain parts appearing in side elevation.

Figure 5:
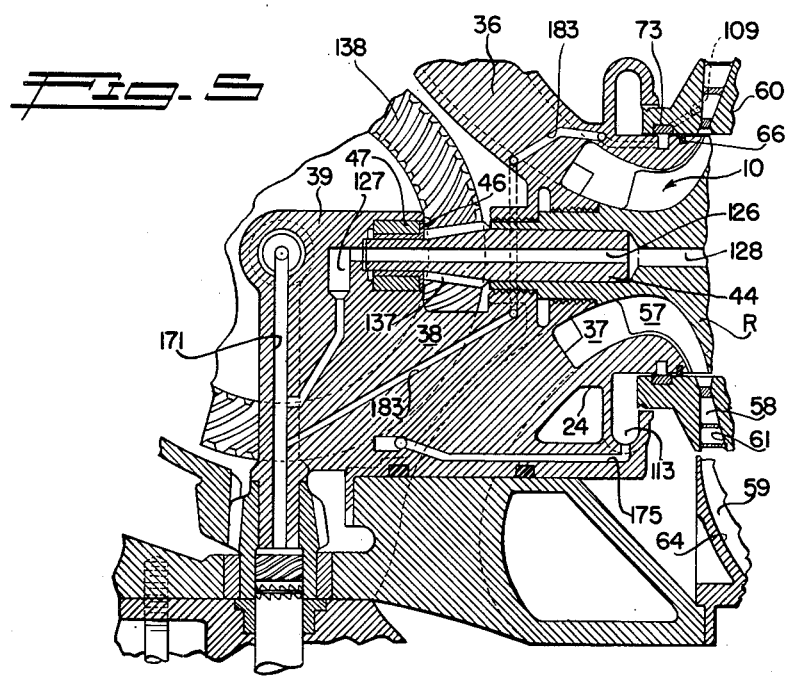
Figure 5 is a fragmentary vertical sectional view of a portion of the plant illustrating certain of the lubricant passages.

The invention is herein disclosed embodied in a power plant intended for the propulsion of aircraft, and the like.

The power plant P includes generally compressor means 10, a heat exchanger 11 receiving the compressed air from the compressor means, a combustion chamber 12, turbine means 13 for driving propeller blading B, a lubricating system 15, a fuel supply system 16, and other elements and features to be described below.

The power plant P is shown arranged within a shroud S to drive propeller blading B as employed in aircraft propulsion. The shroud S is an elongate open-ended tubular member and the power plant is coaxially arranged in the shroud with the blading B within the forward end portion of the shroud. The housing of the power plant P includes an intermediate tubular section 21 having a forwardly and inwardly tapered front portion and a rear part which presents a cylindrical external wall. Cap screws 23 removably secure a forward housing section 22 to the front end of the intermediate section 21. A separately formed cylindrical member 24 is secured within the section 21. A third tubular casing section 28 is removably secured to the rear end of the section 21 by elongate bolts 29 threaded into bosses on a clamp ring 77. The power plant housing further includes a tubular shell 31 attached to the ring 77 and extending rearwardly therefrom to enclose the heat exchanger 11.

Spaced lugs 32 project from the intermediate housing section 21 and carry supporting arms 33 which in turn are fixed to the shroud S to mount the power plant P where it is spaced from the wall of the shroud to leave an annular air passage of substantial capacity.

The compressor means 10 has a series of circumferentially spaced inlet passages 35 which pass inwardly and rearwardly through the wall of the casing section 21 and member 24. The passages 35 are defined by guide vanes 36 and gradually diminish in capacity in a rearward direction to join an annular compressor chamber 37. The compressor further includes a rotor R and a surrounding counter-rotating ring 60. The above-mentioned member 24 has an inwardly extending radial web 38 which carries a journal boss 39, see Figure 5. A similar web 40 is provided on a member 115 at the rear end of the housing section 21 and carries a journal box 41, see Figure 4. A trunnion or axle 42 on the rear end of the rotor R is supported in a bearing 43 carried by the box 41. A shaft 44 is press-fitted or otherwise secured in the forward end of the rotor R and has a journal bushing 46. A bearing 47 in the box 39 carries the shaft 44 and its bushing. The rotor R mounted as just described is positioned coaxially in the power plant housing and is journaled at its opposite ends.

Labyrinth-type seals 54 are provided in a stepped opening 53 in the member 24 to reduce the leakage of air under pressure into the section 21. The above-mentioned chamber 37 is defined by a wall 55 of the member 24 and an external surface of the rotor, these parts being related so that the chamber extends rearwardly from the vanes 36 and then curves radially outward. The rotor R has an intermediate portion 56 of increased external diameter and the forward face of this enlargement forms one wall of the outwardly extending portion of the chamber 37. The chamber 37 decreases in capacity in the direction of flow having a small annular exit at the peripheries of the member 24 and rotor portion 56. Impeller or compressor vanes 57 are provided on the rotor R and operate in the chamber 37, the vanes extending along the hub portion of the rotor and continuing along the base of the enlargement 56 to its periphery. The tips or edges of the vanes 57 conform to and have slight clearance with the curved surface of the wall 55. The vanes 57 have curved forward portions and substantially axial rear portions, the rear extremities leaning or curving forwardly relative to the direction of rotation.

The compressor means further includes a row of counter-rotating diffuser blades 58 and a row of stationary diffuser vanes 59. The blades 58 are carried by the ring 60 which surrounds the cylindrical surfaces of the rotor R and member 24 and are positioned in an annular passage 61 leading radially through the ring. The passage 61 leads from the exit of the chamber 37 to the periphery of the ring and its entrance is convergent while its exit is divergent. The blades 58 are air-foil shaped in cross-section and extend across the passage 61 to connect the opposite end parts of the ring 60. The blades 58 are set at a substantial angle to the radial and are related to define Venturi-shaped passages. Spaced, curved walls 62 and 63 of the casing section 28 define an air discharge passage 64 for the compressor. The passage 64 curves rearwardly and is of rearwardly increasing capacity. A series of stationary diffuser vanes 59 is provided in the passage 64 and the vanes are pitched in the opposite direction to the blades 58 of the ring 60. A sealing ring 66 is set in a peripheral groove in the ring 60 forwardly of the passage 61 and a heat resistant seal 70 is arranged in a groove at the rear of the passage. The seals 66 and 70 cooperate with the ring 60 to prevent the leakage of the compressed air from between the rotor and the ring. The bearing means for the counter-rotating ring 60 may comprise three-directional segmental bearings 73 anchored to the wall 55 and cooperating with a groove in the internal periphery of the ring 60.

The air under pressure supplied by the compressor 10 flows through the heat exchanger 11 to the combustion chamber 12. The heat exchanger includes the shell 31 which extends rearwardly from the ring part 77. The rear end of the shell 31 carries a discharge fitting 79 which in turn joins a shroud 80 on the housing shell 31. A tubular partition 81 is spaced within the shell 31 to leave an annular passage 82 which extends rearwardly from the discharge passage of the compressor 10. An annular bundle of tubes 84 is arranged in the partition 81 and the forward ends of the tubes are secured in openings in a partition plate 85. The rear portions of the tubes 84 are secured in openings in the partition 81 to communicate with the passage. The air under pressure from the compressor 10 flows rearwardly from the passage 82 and enters the rear ends of the tubes 84 to flow forwardly through the tubes to the combustion chamber 12. An exchange of heat between the turbine discharge gases and the compressed air occurs during forward flow of the air through the passage 82 and tubes 84 so that the air is pre-heated before its introduction into the combustion chamber. This is more fully disclosed in my said copending application S. N. 597,308.

The combustion chamber 12 is an annular zone located rearwardly of the counter-rotating ring 60 and in surrounding relation to the turbine 13. The wall 63 which constitutes the rear wall of the air discharge passage 64 extends rearwardly to the heat exchanger partition 81 and a second tabular wall 89 is spaced within the wall 63. These two spaced walls define the combustion zone and have generally cylindrical rear portions and forward parts which curve forwardly and radially inward in converging relation. Protective shrouds 88 and 90 of heat resistant material are spaced from the walls 63 and 89 respectively to leave cooling air passages.

A manifold shroud 300 in the rear portion of the combustion chamber 12 encloses ring sections 93 and 94 which receive fuel and air under pressure for injection into the chamber. Ports 95 and 96 in the web 40 supply fuel and air respectively to the ring sections 93 and 94. The walls of the rings 94 have rows of air orifices 97 which discharge through ports 301 in the shroud 300 and the ring 93 has fuel orifices 98 joining the orifices 97. The orifices 97 and 98 are related so that the fuel is broken up as the fuel-air mixture enters the combustion chamber.

The counter-rotating ring 60 is driven by a row of reaction-type turbine blades 102 projecting axially from the rear face of the ring to extend into the restricted exit throat of the combustion chamber 12. The blades 102 extract only a small proportion of the energy from the gases and air and their arrangement in the nozzle of the combustion chamber 12 avoids the use of a stationary nozzle ring.

Provision is made for lubricating the bearings of the combination compressor and turbine ring 60, and for internally cooling the ring. An annular passage 110 is provided in the ring 60 in adjacent relation to the buckets 102, and a series of ports 109 lead from the above described bearing 73 to the passage. An oil supply passage 183 is formed in the casing member 24 (see Figure 5) to conduct oil to the bearing 73, the lubricating system to be hereinafter described, delivering oil under pressure to the passage 183. A series of return or discharge ports 112 extend axially forward through the ring 60 from the annular cooling passage 110 and discharges into an annular trough 113 formed on the member 24. The ports 109 and 112 are substantially 180° apart and pass axially through blades 58 of the ring 60. A return passage 175 in the member 24 conveys the returning oil from the trough 113 to the general lubricating system, as will be later described. The trough 113 further serves to trap oil that leaks or passes forwardly between the counter-rotating ring 60 and the cylindrical surface of the member 24. It will be seen that the lubricating oil supplied to the passage and port system just described, effectively lubricates the bearings of the counter-rotating ring 60, and in addition, cools the portion of the ring which is subject to the high temperature gases acting on the blading 102 of the ring.

The turbine 13 includes the cylindrical rear portion of the rotor R and the curved rear face of the rotor which merges with the cylindrical portion. The wall 89 has a tubular part 104 in spaced surrounding relation to these portions of the rotor R to define the expansion zone of the turbine. A row of Francis-type blading 105 on the rotor R operates in the curved entrance of the expansion zone. Rows of impulse buckets 106 are provided on the cylindrical portion of the rotor R and rows of stator blades 107 on the wall 104 stand between the impulse buckets. A discharge member 115 is associated with the web 40 and engages around the rear part of the wall 104. The member 115 has a collector chamber at the rear end of the expansion zone and outwardly curved ducts 118 direct the exhaust gases from the collector chamber to the heat exchanger. A shell or tube 120 extends rearwardly from the member 115 and is spaced within the bundle of tubes 84 to form the inner wall of the heat exchanger.

The compressor-turbine rotor R is constructed for effective cooling by the internal circulation of a coolant. In accordance with the invention the lubricating oil of the power plant forms the coolant for the rotor. A longitudinal opening 126 is provided in the shaft 44 at the forward end of the rotor R to conduct the oil from a passage 127 in the boss 39 to a central passage 128 in the forward hub or compressor portion of the rotor R; see Figure 3. The rear part of the passage 128 flares into an annular distributing space which supplies the coolant to a multiplicity of circumferentially spaced axial ducts 129. The ducts 129 are spaced inwardly from and follow, generally, the peripheral surface of the rotor R, extending radially from the passage 128 into the rotor enlargement 56, then curving rearwardly and inwardly in generally concentric relation to the curved rear face of the enlargement 56 and continuing rearwardly in parallel relationship to the cylindrical turbine portion of the rotor surface to a collector passage 130 in the rear journaled-part of the rotor. The passage 130 communicates with a return passage 131, which extends downwardly through the journal block 41 and the web 40 to return the oil to the lubricating system as will be more fully described.

The lubricant is supplied to the rotor passage 128 under substantial pressure and flows through the multiplicity of ducts 129 at a high velocity. The rapidly flowing oil in the series of closely spaced ducts 129 effectively carries heat away from the peripheral zone of the turbine portion of the rotor R and the buckets 105 and 106 carried thereby. It will be observed that this mode of cooling the rotor R allows the central highly stressed part of the rotor to remain solid and imperforate, and reduces the metal in the peripheral parts of the rotor to lessen the centrifugal effects. The oil traveling through the journal portion 42 and the block 41 aids in cooling these parts.

It is desirable to internally cool the journal block 41 which carries the rear rotor bearing 43. In Figures 3 and 4 I have shown an internal annular passage 280 in the block 41 and a cooling air passage 281 extending downwardly through the web 40 and block 180 from the passage 280 to the discharge passage 82 of the compressor means 10. An annular air-seal groove 282 is provided in the block 41 to surround the rotor R, and has communication with the cooling passage 280 to receive air under pressure therefrom. The air under pressure in the groove 282 prevents the combustion gases in the expansion zone of the turbine from entering the journal block 41 where it would contaminate the lubricant in the bearing 43. The air under pressure supplied to the cavity or passage 280 by the duct 281 cools the block 41 and bearing 43, and continuously bleeds away from the seal groove 282 during power plant operation.

The gearing for transmitting power from the rotor R to the propeller blading B includes two aligned cross shafts 133. Bearings 134 in the boss 39 carry the inner ends of the shafts and bearings 135 in caps 136 of the housing sections 21 and 22 carry the outer ends of the shafts. A pinion 137 on the rotor shaft 44 meshes with the gears 138 fixed on the shafts 133. The gears 138 are of substantial diameter to provide a considerable speed reduction. A tubular propeller shaft 139 extends axially in the casing section 22 and is carried by anti-friction bearings 140 and 141. A gear 142 of substantial diameter is formed on the rear end of the propeller shaft 139 and is driven by pinions 143 fixed on the outer portions of the cross shafts 133 to provide a second stage of heat reduction.

The coupling between the shaft 139 and the propeller B comprises a block 144 secured in the forward end of the shaft. The block 144 has a threaded opening for receiving a connecting stud (not shown) and is provided with curvic face splines 9 for cooperating with corresponding splines on the propeller hub assembly.

The power plant is a self-contained unit embodying a fuel injection system, a lubricating system and a starting system, together with a manually settable control. These several elements are intimately associated with the power plant and are arranged so that their principal parts are readily removable for servicing, replacements, etc. Many of these parts are incorporated in a housing assembly removably secured to the power plant casing. In the drawings I have shown a flat surfaced boss 145 on the lower side of the casing section 22 to form a mounting. A motor generator case 146 is engaged against the boss 145 to extend downwardly from the power plant and contains a motor generator 213. The fuel supply system 16 includes a blower 147 arranged at the lower side of the case 146. The blower 147 is of the Roots-type and comprises a housing formed of two end plates 148 separated by an intermediate margin plate 149. The shaft 150 of the motor generator passes through the blower housing and a blower rotor 151 is fixed to the shaft. The lobed rotors 151 of the blower are identical and carry meshing timing gears 152.

The pump 183 of the lubricating system 15 is arranged below the blower 147 and its housing is made up of two end plates 154 and a scroll plate 155. The upper end of the plate 154 is formed to have a chamber 157 containing the timing gears 152 of the blower. The inlet port 158 of the lubricant pump delivers the oil into the chamber 157. The lubricating pump further includes a rotor 156 fixed to the shaft 150 and operating within the scroll plate 155. The plate 155 defines a partial scroll chamber for the centrifugal rotor. A carbon seal, or the equivalent, seals about the hub of the rotor 156. The pump of the fuel supply system is arranged below the lubricant pump 153 and includes a lower housing plate 163 and a scroll plate 164 arranged between the plate 163 and the lower plate 154 of the lubricant pump 153. The rotor 165 of the fuel pump is fixed to the motor generator shaft 150 to operate within the scroll plate 164. Cap screws 162 pass through openings in the motor generator case 146 and through aligned openings in the several plates of the blower 147, the lubricant pump 153 and a fuel pump. The upper portions of these screws 162 thread into openings in the boss 145 to secure the assembly to the power plant casing. Upon threading the screws 162 the several elements of the unit just described are detachable and thus made accessible.

The lubricant supply system 15 includes the pump 153 described above which has a discharge port 166 leading through the scroll ring 155 and then downwardly through the plates 163 and 164 of the fuel pump. The lower portion of the port 166 extends inwardly to the central opening 167 in the lower plate 163 where it terminates in an annular groove in communication with radial ports 168 provided in the motor generator shaft 150. A fluid passage 169 extends upwardly through the shaft 150 from the radial ports, and its upper end discharges into a vertical opening 171 in a stationary trunnion 172 formed on the forward edge of the above-mentioned web 38. The lubricant flowing through the shaft 150 serves to cool the armature of the motor generator. The opening 171 discharges into the boss 39 between the inner ends of the shafts 133 as shown in Figure 3. The lubricant thus supplied to the boss lubricates the bearings 134 of the cross shafts 133. The cross shafts 133 have longitudinal passages 173 for conveying the oil from the interior of the boss 39 to the socketed caps 136 where it lubricates the bearings 135 of the cross shafts.

The above referred to passage 127 in the web 38, and best illustrated in Figure 5, communicates with the passage 171 to receive oil under pressure therefrom, and conducts it to the forward end of the rotor shaft passage 126 to cool the rotor R and lubricate the bearing 43 at the rear end of the rotor as described above. A portion of the oil flowing from the pasasge 127 to the passage 126 finds its way to the forward bearing 47 of the rotor. A passage 183 is provided in the member 24 and extends from the port 171 to the bearing 73 to supply lubricant to the bearings of counter-rotating ring 60 and to flow through the passages 109, 110 and 112 to cool the counter-rotating ring. This lubricant flows into the trough 113 and discharges through a return passage 175 to reach the interior of the casing section 21. The passage or duct 183 extends through the web 38, one of the vanes 36 and the wall 55 to reach the groove which carries the bearing segments 73 of the counter-rotating ring 60.

The lubricating system 15 further includes an oil sump 176 arranged below the power plant at the rear of the auxiliary unit or assembly described in detail above. The sump 176 is preferably dural casting provided on its external surfaces with deep heat radiating ribs 177. An internal web 178 is provided in the sump 176, and the upper sides of the sump has a flat boss or face engaging the under side of the block 180. The block 180 in turn bears upwardly against a horizontal face on the lower end of the above-mentioned web 40. Studs or cap screws 181 pass upwardly through vertical openings in the sump 176 and its web 178 and continue upwardly through openings in the block 180 to thread into openings in the lower end of the web 40, thus securing the sump and the block to the power plant case. Horizontal cap screws 260 extend rearwardly through openings in the lower plate 163 and an upper plate or casing section of the above described auxiliary assembly, and thread into openings in the forward flange or boss 261 of the sump to clamp the boss and said assembly in tight engagement.

As above-mentioned, the hot lubricant from the rotor cooling passages 129 flows through the collector passage 130 to the oil return port 131. This return port 131 passes downwardly through the journal block 41 and continues downwardly through the web 40 and block 180 to the sump 176 where it communicates with a cooling passage 185. The cooling passage 185 preferably comprises several convolutions in the side wall of the ribbed sump and terminates in a discharge which empties into the sump; see Figure 4. The passage 185 may be provided by casting a suitable coil of copper tubing, or the like, in the sump casting. A lubricant return or drain duct 186 leads from the lower portion of the casing section 21 to the sump 176 to return the oil from the interior of the casing to the sump as shown in Figure 2. The passage 185 arranged as above described brings the returning hot oil in close proximity to the heat dissipating ribs 261, and in the event the oil level in the sump becomes low, there is still ample heat dissipation by the ribs 177 adjacent the convolute passage 185.

The fuel supply system 16 includes a duct 187 extending from the compressor outlet passage 82 and passing through the sump wall 178 to the inlet of the blower 147. A duct 188 returns the air back through the web 178 to the block 180 and connects with passage 95 to deliver the compressed air to the injection ring 93. The air moves in heat transfer relation to the oil in the sump so as to be heated as it flows to the injector ring. A fuel supply line 192 leads from a fuel source, not shown, to the intake of the fuel pump and a duct 193 extends from the pressure side of the pump through the sump web 178 and block 180 to the passage 96 leading to the fuel injecting ring 94. In practice the fuel supply system 16 includes certain valved controls, etc., not essential to an understanding of the present invention.

The above-mentioned motor generator 213 constitutes an element of the means for starting the power plant, and in addition, serves to pre-lubricate the various power plant bearings, initially raise the fuel pressure, etc. The present invention is not primarily concerned with the means for starting the power plant and these features are omitted, however, they are disclosed in my said copending application, Serial No. 597,308. The motor generator is circuited to serve as a motor during starting of the power plant and to serve as a generator when the power plant is in power producing operation.

A releasable or overrunning drive is provided between the motor generator 213 and the transmission of the power plant rotor R so that the motor generator is driven by the power plant to operate as a generator during power plant operation. The overrunning drive includes a pinion 222 freely rotatable on the stationary trunnion 172 and meshing with the gear 142; see Figure 2. The pinion 222 is supported by the trunnion and a bearing 223 carried by the above-mentioned boss 145 of the power plant case. The shaft 150 of the motor generator has its upper end portion supported by a bearing 224 in the case 146, and a plug 225 is arranged in the lower end of the pinion 222 to oppose the end of the shaft. The opposing ends of the shaft 150 and plug 225 have cooperable clutch teeth 226. Spiral splines 227 are provided on the plug 225 and the interior of the pinion 222, and cooperate to feed the plug downwardly and thus engage the clutch teeth 226 when the pinion 222 is driven by the power plant to rotate with respect to the shaft 150 of the motor generator. Thus when the power plant is in operation the motor generator is driven to supply current to the battery circuit. When the motor generator is operating as a motor, the clutch teeth force the plug 225 upwardly to disengage the teeth.

It is believed that it will be apparent how the lubricant pump 153 is operated during starting of the power plant to raise the lubricant pressure and to deliver the lubricant to the several bearings. This pre-lubricates the bearings, that is, lubricant under pressure is supplied to the various bearings before the power plant actually goes into operation. During operating of the engine lubricant is continuously pumped through the passage 171 to lubricate the bearings 134 and 135 of the speed reduction transmission and flows through the duct 127 to lubricate the bearing 47. The lubricant continues through passage 126 into the rotor R where it flows axially through the several spaced marginal passages or ducts 129 to cool both the compressor and turbine portions of the rotor. The lubricant which has absorbed heat during its flow through the rotor passages 129 is discharged into the sump 176. As previously described a portion of the heat thus absorbed by the lubricant is utilized to preheat the air and fuel circulated through the ducts 187, 188 and 158 before the air and fuel is delivered to the injection rings 93 and 94. This materially increases the thermal efficiency of the power plant. Lubricant is also supplied through the passage 183 to the bearing 73 of the counter-rotating ring 60 and flows through the passages of the ring to cool the same.

Having described only a typical preferred form of the invention, I do not wish to be restricted to the specific details herein described, but wish to reserve to myself any features or modifications that may fall within the scope of the following claims.

I claim:

1. In a gas turbine power plant; a continuous elongate compressor-turbine rotor body including a portion of increased diameter spaced between its ends, a bladed compressor portion at one side of said portion of increased diameter, a bladed turbine portion at the other side of said portion of increased diameter, and axle portions on the ends of the rotor body, the rotor body having a coolant chamber of large diameter in the radial plane occupied by said portion of increased diameter, having a coolant supply passage leading through one axle portion and the compressor portion to said chamber to conduct coolant thereto so that the chamber and coolant therein serve to assist in thermally isolating the compressor portion from the hotter turbine portion, having a plurality of individual circumferentially spaced coolant ports of relatively small diameter extending from said chamber and passing through the turbine portion in adjacent but inwardly spaced relation to the periphery thereof, and having a common passage in the other axle portion joining said ports to receive the coolant therefrom.

2. In a gas turbine power plant; a continuous elongate compressor-turbine rotor body including a portion of increased diameter spaced between its ends, a bladed compressor portion at one side of said portion of increased diameter, a bladed turbine portion at the other side of said portion of increased diameter, and axle portions on the ends of the rotor body, the rotor body having a coolant chamber of large diameter in the radial plane occupied by said portion of increased diameter, having a coolant supply passage leading through one axle portion and the compressor portion to said chamber to conduct coolant thereto so that the chamber and coolant therein serve to assist in thermally isolating the compressor portion from the hotter turbine portion, having a plurality of individual circumferentially spaced coolant ports of relatively small diameter extending from said chamber and passing through the turbine portion in adjacent but inwardly spaced relation to the periphery thereof, and having a common passage in the other axle portion joining said ports to receive the coolant therefrom, the rotor body being solid except for said passages, chamber and ports to have a strong solid central region in the turbine portion for assuming the heavy bursting stresses incident to high speed rotation.

NATHAN C. PRICE.

References Cited in the file of this patent

UNITED STATES PATENTS

| Number | Name | Date |
|---|---|---|
| 100,221 | Wagner | Feb. 22, 1870 |
| 1,130,422 | Mueller | Mar. 2, 1915 |
| 1,290,638 | Morgan | Jan. 7, 1919 |
| 1,756,707 | Sundstrand | Apr. 29, 1930 |
| 1,820,725 | Bailey | Aug. 25, 1931 |
| 1,878,744 | Wilson | Sept. 20, 1932 |
| 1,881,012 | Wiltse | Oct. 4, 1932 |
| 1,926,225 | Birmann | Sept. 12, 1933 |
| 2,028,603 | Heinze | Jan. 31, 1936 |
| 2,213,940 | Jendrassik | Sept. 3, 1940 |
| 2,280,835 | Lysholm | Apr. 28, 1942 |
| 2,296,701 | Butler et al. | Sept. 22, 1942 |
| 2,344,366 | Price | Mar. 14, 1944 |
| 2,369,795 | Planiol et al. | Feb. 20, 1945 |
| 2,393,963 | Berger | Feb. 5, 1946 |
| 2,400,714 | Rowledge et al. | May 21, 1946 |
| 2,402,467 | Thompson | June 18, 1946 |
| 2,405,723 | Way | Aug. 13, 1946 |
| 2,432,359 | Streid | Dec. 9, 1947 |
| 2,435,990 | Weiler | Feb. 17, 1948 |
| 2,439,273 | Silvester | Apr. 6, 1948 |
| 2,441,135 | Chalupa | May 11, 1948 |
| 2,450,960 | Heintz | Oct. 12, 1948 |
| 2,479,573 | Howard | Aug. 23, 1949 |

FOREIGN PATENTS

| Number | Country | Date |
|---|---|---|
| 484,289 | Great Britain | May 3, 1938 |
| 665,762 | Germany | Oct. 3, 1938 |